United States Patent [19]

Kunishige

[11] Patent Number: 5,309,072
[45] Date of Patent: May 3, 1994

[54] DISTANCE MEASUREMENT APPARATUS FOR CAMERA, AND DISTANCE MEASUREMENT METHOD

[75] Inventor: Keiji Kunishige, Tokyo, Japan
[73] Assignee: Olympus Optical Co., Ltd., Tokyo, Japan
[21] Appl. No.: 889,450
[22] Filed: May 27, 1992
[30] Foreign Application Priority Data
  Jun. 5, 1991 [JP] Japan .................. 3-134433
[51] Int. Cl.$^5$ ............................. G03B 13/36
[52] U.S. Cl. .................................. 354/403
[58] Field of Search ............... 354/403, 408, 402
[56] References Cited
  U.S. PATENT DOCUMENTS
  5,136,148  8/1992  Nonaka ................ 354/403 X

*Primary Examiner*—W. B. Perkey
*Attorney, Agent, or Firm*—Frishauf, Holtz, Goodman & Woodward

[57] ABSTRACT

An auto-focus apparatus for a camera includes a distance measurement unit for projecting infrared light toward an object, receiving the infrared light reflected by the object, and outputting a signal according to an object distance. A control unit operates the distance measurement unit twice at a predetermined time interval. A discrimination unit discriminates on the basis of two output signals output from the distance measurement unit whether or not the object is moving to the near distance side by an amount equal to or larger than a predetermined amount. An arithmetic unit converts the output signals from the distance measurement unit into an extension amount of a photographing lens. The arithmetic unit adds a predetermined value to the extension amount when the discrimination unit discriminates that the object is moving to the near distance side.

19 Claims, 9 Drawing Sheets

DISTANCE MEASUREMENT APPARATUS FOR CAMERA, AND DISTANCE MEASUREMENT METHOD

BACKGROUND OF THE INVENTION

1. Field of the Invention

The present invention relates to a distance measurement apparatus for a camera having an auto-focus mechanism for driving a photographing lens on the basis of an output from a distance measurement means, and a distance measurement method.

2. Description of the Related Art

A camera having an auto-focus mechanism has a long release time lag from when a release button of the camera is depressed until an exposure operation is started. For this reason, when an object moving in the optical axis direction of the camera is to be photographed, a defocused state of the photographing lens occurs.

As a means for solving the above-mentioned problem, Published Unexamined Japanese Patent Application Nos. 63-118133 and 63-159817 disclose an apparatus, which detects the moving speed of an object to predict the position of an object at the beginning of exposure, and drives the photographing lens according to the predicted position.

However, in this prior art, complicated arithmetic operations are required for predicting object movement, and the release time lag is increased, thus missing a shutter chance. Furthermore, the arithmetic operations are performed under a condition that the moving speed of an object is ideally and precisely obtained, and do not consider the influence caused by an error of the moving speed. As a result, the following problems are posed.

Figure 10:
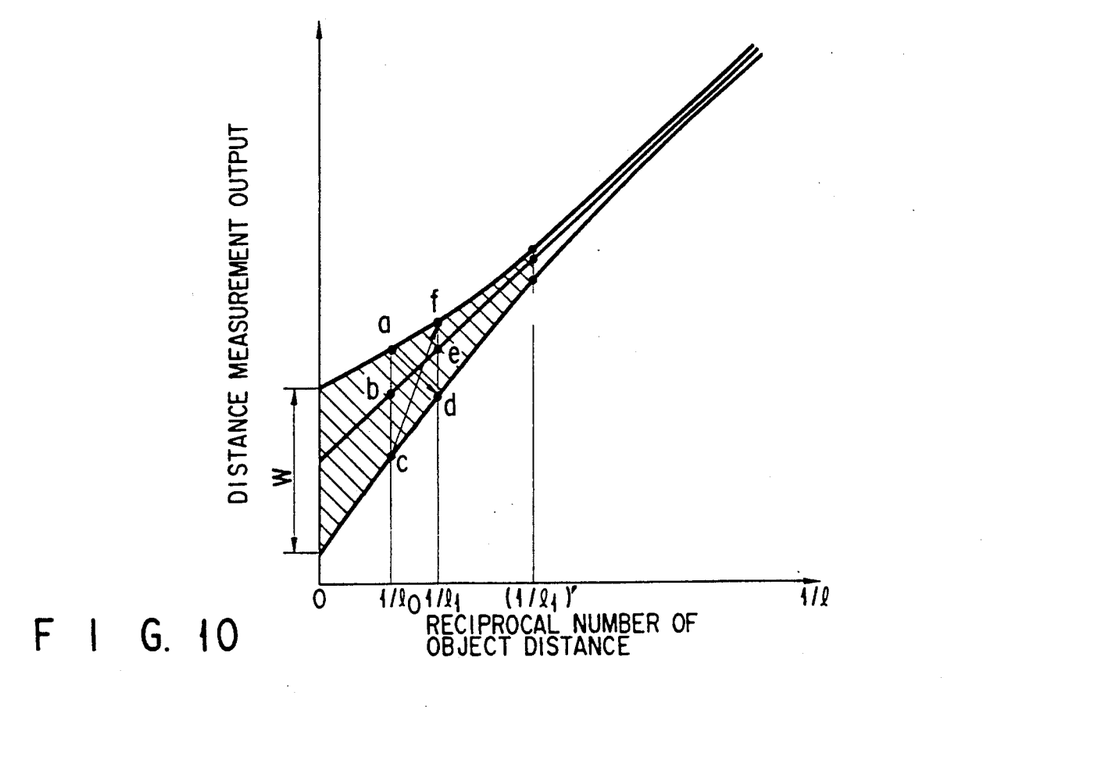
FIG. 10 is a graph for explaining a difference in precision upon movement judgment of an object.

More specifically, in a distance measurement apparatus, e.g., in an active type triangulation apparatus, which provides a basis for obtaining the moving speed of an object, as shown in FIG. 10, its output varies and has a given indefinite width W in each distance measurement. The indefinite width W has the following tendency. That is, the indefinite width W is small for a near distance at which the light amount is large, but becomes large for a far distance at which the light amount is small.

For example, when an object moves from $1/l_0$ to $1/l_1$, the distance measurement value may change from a to d, b to e, or c to f. The change from a to d corresponds to an extreme case. In this case, although an object is moving toward a camera, a moving speed as if it were moving away from the camera is obtained.

When correction is made based on the change from c to f, this results in overcorrection and a defocused state.

Furthermore, when the time required for obtaining the moving amount of an object is assumed to be, e.g., 50 msec, and the release time lag is assumed to be 400 msec, an object distance at the exposure start time after an elapse of 400 msec is predicted on the basis of the moving amount of the object during the 50-msec period. As a result, a moving amount error if any is amplified to 400/50=8 times, and the possibility of a defocused state is further increased.

However, when the number of times of light projection in each distance measurement is increased or the time for measuring the moving amount of an object is prolonged to reduce the error, the time lag is further increased, and a shutter chance itself is missed.

SUMMARY OF THE INVENTION

It is, therefore, an object of the present invention to provide a distance measurement apparatus and method for a camera, which can correct a defocused state caused by the movement of an object by a simple calculation, and can reduce a time lag for moving object correction as much as possible.

In order to achieve the above object, according to one aspect of the present invention, there is provided an auto-focus apparatus for a camera, comprising:

distance measurement means for projecting infrared light toward an object, receiving the infrared light reflected by the object, and outputting a signal according to an object distance;

control means for operating the distance measurement means twice at a predetermined time interval;

discrimination means for discriminating on the basis of two output signals output from the distance measurement means operated by the control means whether or not the object is moving to a near distance side by an amount not less than a predetermined amount;

arithmetic means for converting the output signals from the distance measurement means into an extension amount of a photographing lens, the arithmetic means including means for, when the discrimination means discriminates that the object is moving to the near distance side, adding a predetermined value to the extension amount; and driving means for driving the photographing lens from an initial position to a position based on a conversion output from the arithmetic means.

According to another aspect of the present invention, there is provided an auto-focus method for a camera, comprising the steps of:

performing a first distance measurement operation according to a half-stroke operation of a shutter release button;

driving a photographing lens on the basis of a first distance measurement result;

performing a second distance measurement operation after the photographing lens is driven;

discriminating on the basis of the first and second distance measurement results whether or not a moving amount of an object in a photographing optical axis direction is not less than a predetermined amount; and additionally driving the photographing lens when the discrimination results indicates that the moving amount is not less than the predetermined amount.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The first embodiment of the present invention will be described below with reference to FIGS. 1 and 2.

Figure 1:
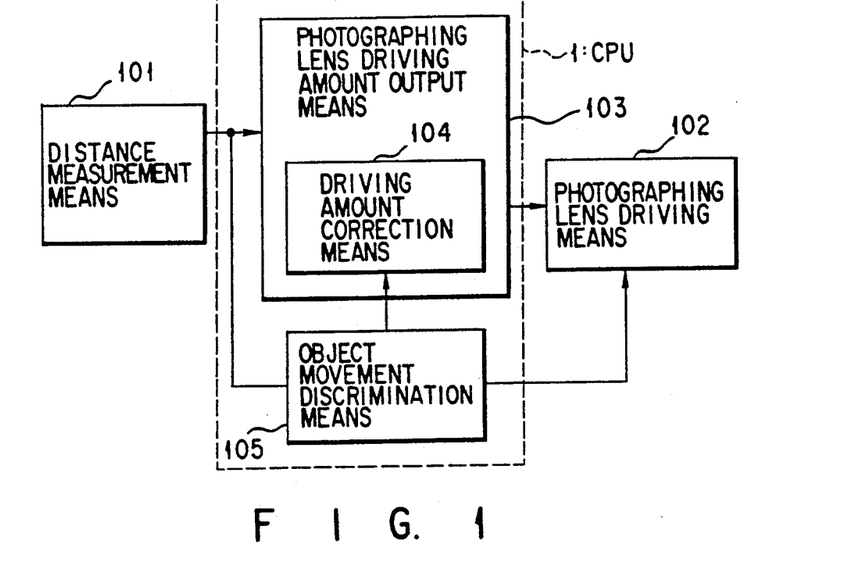
FIG. 1 is a block diagram for explaining the basic principle of the present invention.
Figure 2:
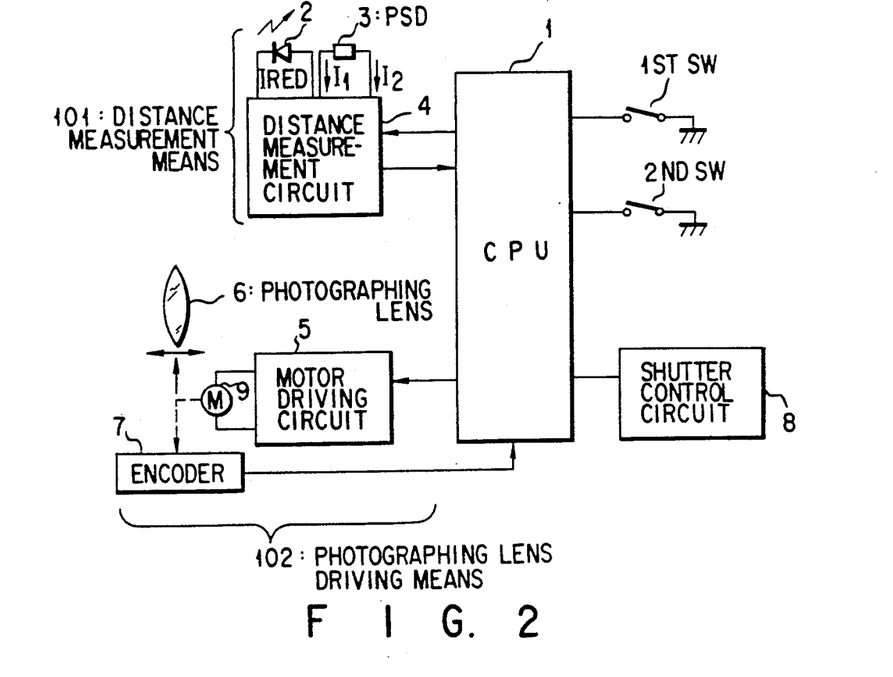
FIG. 2 is a block diagram showing the first embodiment of the present invention.

In FIGS. 1 and 2, a 1st SW is a switch which is turned on at a half-stroke position of a release button, and a 2nd SW is a switch which is turned on at a full-stroke position of the release button. When the 1st SW is ON, a CPU 1 operates a distance measurement circuit 4 to time-serially turn on an IRED 2 in response to pulses. As is well known, a PSD 3 receives light emitted from the IRED 2 and reflecteed by an object, and changes currents I1 and I2 according to the incident position of the reflected light. An arithmetic circuit in the distance measurement circuit 4 receives the currents I1 and I2, and calculates $I1/(I1+I2)$ or $(I1-I2)/(I1+I2)$. The arithmetic circuit supplies the calculation result to the CPU 1 as a distance measurement value.

When the 2nd SW is turned on, a motor driving circuit 5 moves a photographing lens 6 from an $\infty$ position to an in-focus position by a motor 9 according to the output from the CPU 1. As is well known, an encoder 7 is connected to the photographing lens 6, and feeds back a lens moving amount to the CPU 1. Upon reception of encoder pulses, the CPU 1 outputs a stop signal to the motor driving circuit 5 when the photographing lens 6 is moved by a necessary amount. A shutter control circuit 8 opens/closes a shutter upon completion of the movement of the photographing lens 6.

The CPU 1 causes a distance measurement means 101 to perform a distance measurement operation a plurality of number of times, and calculates the moving amount of an object in the lens optical axis direction on the basis of these distance measurement results. More specifically, the distance measurement operation is performed twice at a predetermined time interval, and a moving position upon photographing of the object is predictively calculated on the basis of the difference between the two distance measurement results.

The CPU 1 further comprises a driving amount correction means 104 for adding a predetermined correction amount to the first distance measurement data to move the photographing lens 6. When the moving amount of an object is equal to or smaller than a predetermined amount, the motor driving circuit 5 moves the photographing lens 6 on the basis of the first distance measurement result; when the moving amount is larger than the predetermined amount, the circuit 5 moves the photographing lens 6 on the basis of the output from the driving amount correction means 104.

Prior to the description of the operation of the first embodiment, the idea of correction in this embodiment will be explained below with reference to FIG. 9.

Figure 9:
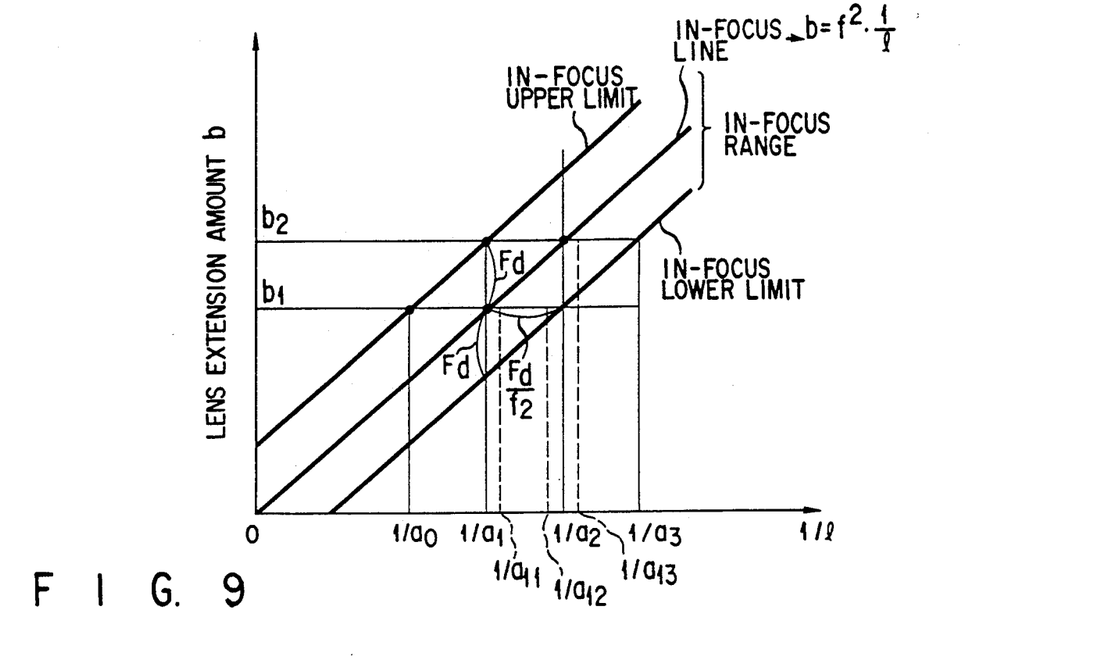
FIG. 9 is a graph for explaining the idea of correction.

In FIG. 9, a reciprocal number of an object distance l is plotted along the abscissa, and a lens extension amount b is plotted along the ordinate. Ideally, as indicated by an in-focus line in FIG. 9, b and 1/l have a one-to-one correspondence therebetween. However, as a photograph, an in-focus state can be determined within a range defined by in-focus upper and lower limit lines in FIG. 9 in consideration of an allowable circle of confusion. More specifically, when the lens extension amount b is b1, an in-focus state is attained when the object distance $1/l = 1/a1$ in a strict sense. However, when the object distance $1/l$ falls within a range between $1/a0$ and $1/a2$ before and after $1/a1$, an in-focus state as a photograph can be obtained. Therefore, when the first distance measurement result $1/l_0$ is $1/a1$, and when a distance measurement result $1/l_1$ obtained after an elapse of a predetermined period of time, e.g., after an elapse of 50 msec, is $1/a11$, if a predicted object position after an elapse of a predicted release time lag (e.g., 400 msec), i.e., at the beginning of the actual opening operation of a shutter, falls within a range between $1/a1$ and $1/a2$, e.g., is $1/a12$, a photograph in an in-focus state can be obtained even when the photographing lens 6 is extended on the basis of the first data $1/a1$.

In contrast to this, if the predicted object position is $1/a13$, an in-focus state cannot be attained when the lens is extended according to the data $1/a1$. However, in this case, if a lens extension amount based on $1/a2$ is given by b2, an in-focus state can be attained for an object at a distance $1/a13$.

More specifically, when a discrimination level is represented by CP, the level CP is given by $CP = (1/a2 - 1/a1) \times$(measurement time interval between $1/l_0$ and $1/l_1$)/(time lag). When a deviation is larger than CP the extension amount is corrected by Fd to consequently perform a photographing operation at a distance $1/a2$; when the deviation is equal to or smaller than CP, a photographing operation at a distance $1/a1$ can be performed.

As a result, in this embodiment, moving object correction capable of focusing on an object having a moving speed up to a maximum of $(a3-a1)/$(time lag) is performed.

Practical examples of the above-mentioned numerical values of, e.g., a photographing lens having a full-aperture value F7 and a focal length f=80 mm will be explained below. If a diameter d of a maximum allowable circle of confusion is 60 μm, the time lag of a camera is 400 msec, a measurement time interval between $1/l_0$ and $1/l_1$ is 100 msec, $CP = (7 \cdot 60 \ \mu m)/(80 \ mm)^2 \times (100 \ msec)/(400 \ msec) = 0.0164 \ (1/m)$ is determined as a movement discrimination level. When a deviation is larger than this level, the lens extension amount is corrected toward the near distance side by $Fd = 7 \times 60 \ \mu m$ (defocus amount).

With the above correction, for example, for an object at a distance of 4m, moving object correction capable of focusing on an object having a moving speed up to (70 mm)²/{(70 mm)² /4m+2·7·60 m}/400 msec = $4.9 \times 10^{-3}/\{1.225 \times 10^{-3} + 8.4 \times 10^{-4}\}/400$
msec = 5.93 (m/sec), i.e., 21.4 km/hour, is performed.

The operation of this embodiment will be described below with reference to the flow chart shown in FIG. 3.

Figure 3:
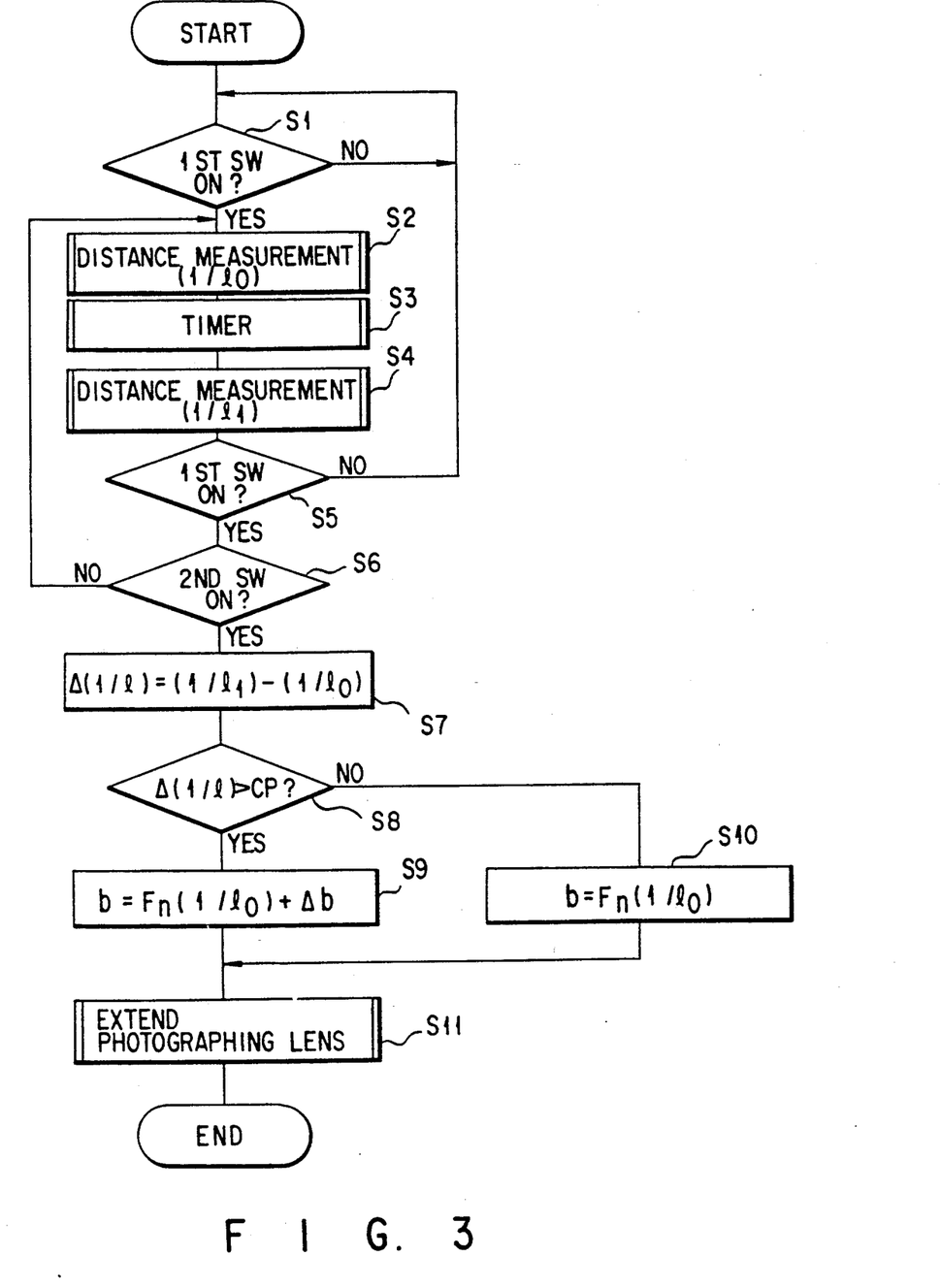
FIG. 3 is a flow chart for explaining the first embodiment of the present invention.

In step S1 in FIG. 3, the distance measurement means 101, the CPU 1, and the like of the camera wait until the 1st SW is ON. When the 1st SW is ON, the flow advances to step S2.

Figure 4:
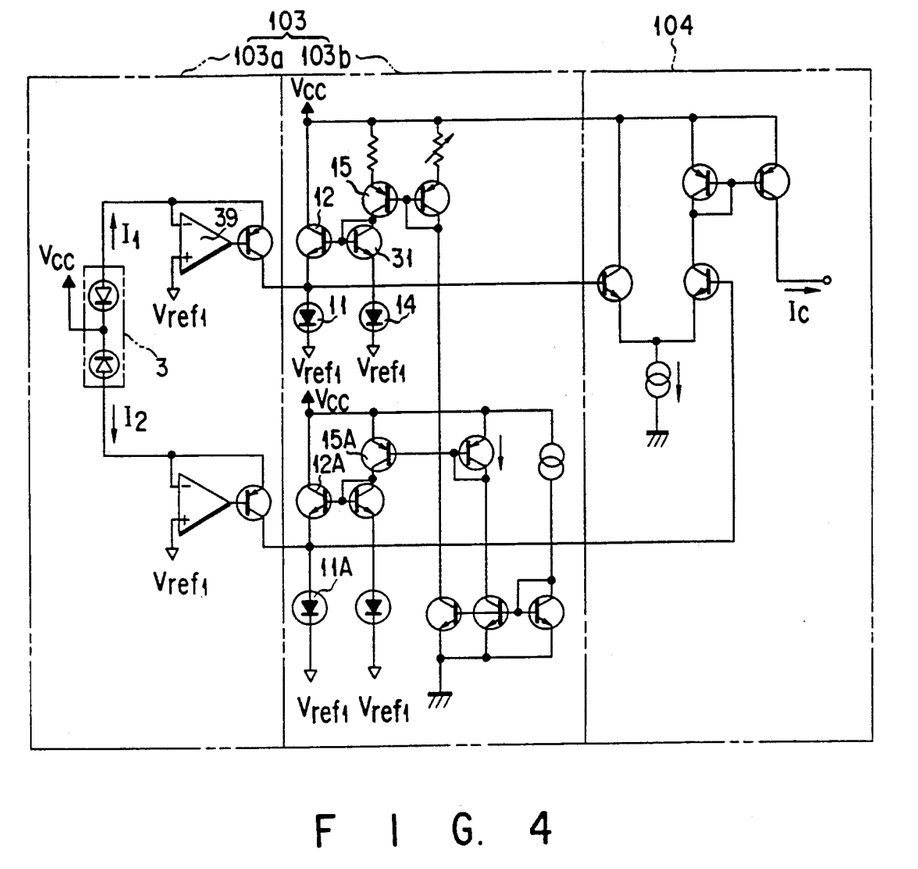
FIG. 4 is a circuit diagram showing an arrangement of a distance measurement means.
Figure 5:
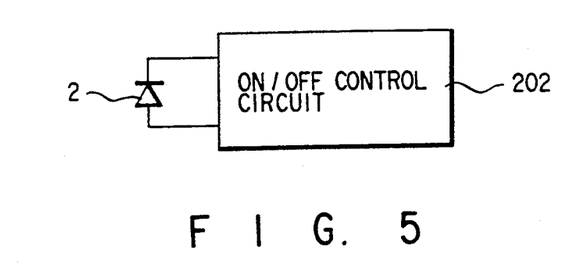
FIG. 5 is a circuit diagram showing an ON/OFF control circuit for performing ON/OFF control of an IRED.

In step S2, the CPU 1 enables the distance measurement means 101 to perform the first distance measurement operation. The distance measurement means 101 can comprise a known arrangement, as described in, e.g., Published Unexamined Japanese Patent Application No. 1-150809. The distance measurement means 101 has the following arrangement. More specifically, in FIG. 4, ON/OFF control of the IRED 2 is performed in response to pulses from an ON/OFF control circuit 202 shown in FIG. 5. A photocurrent detection circuit unit 103 comprises a preamplifier circuit section 103a connected to the PSD 3, and a bias setting circuit section 103b. An arithmetic circuit unit 104 outputs $I_c = I_1/(I_1 + I_2)$, as is well known. At one anode output side of the PSD 3, the base of a PNP transistor 30 is connected to the output terminal of an operational amplifier 39, its emitter is connected to the inverting input terminal of the operational amplifier 39, and its collector is connected to the anode of a diode 11. A first photocurrent $I_1$ from the PSD 3 is pre-amplified by the operational amplifier 39, which is negatively fed back by the transistor 30, and is input to the compression diode 11. A transistor 31 is equivalent to a base-emitter junction diode since its collector and base are short-circuited. Therefore, the transistor 31 constitutes a current-mirror circuit together with a transistor 12, the diode 11, and a diode 14. The transistor 12 operates so that a bias current equal to a collector current $I_{B1}$ of a transistor 15 flows through the diode 11. Since the same arrangement is employed at the other anode output side of the PSD 3, a transistor 12A operates so that a bias current equal to a collector current $I_{B2}$ of a transistor 15A flows through a diode 11A.

With the above-mentioned distance measurement operation, a first distance measurement value $1/l_0$ is obtained. This value is stored in a memory M(0) (not shown) in the CPU 1.

In step S3, the control waits for an elapse of a predetermined period of time, e.g., 50 msec, by a timer means in the CPU 1.

In step S4, after the elapse of the predetermined period of time by the timer means, a second distance measurement operation is performed, and a second distance measurement value $1/l_1$ is obtained. This value is stored in a memory M(1) (not shown) in the CPU 1.

If it is determined in step S5 that the 1st SW is OFF, the flow returns to step S1, and a standby state is set until the 1st SW is turned on. On the other hand, if it is determined that the 1st SW is kept ON, the flow advances to step S6.

If it is determined in step S6 that the 2nd SW is ON, the flow advances to step S7; otherwise, the flow in steps S2 to S5 is repeated, and distance measurement values at predetermined time intervals are sequentially stored in the memories M(0) and M(1).

In step S7, a moving amount $\Delta(1/l)$ of an object is calculated. Since this calculation can be attained by only performing subtraction of data read out from the memories M(0) and M(1), even a low-level microcomputer at a clock speed of 2 MHz as a camera microcomputer can complete this calculation within several tens of usec, and the calculation time can be ignored.

In step S8, it is checked if $\Delta(1/l)$ is larger than the discrimination level CP. If it is determined that $\Delta(1/l)$ is larger than the discrimination level CP, i.e., if it is determined that an object is largely moving in the optical axis direction, the flow advances to step S9; otherwise, i.e., if it is determined that the object is not moving so largely, the flow advances to step S10.

The discrimination level CP is determined based on a variation in $\Delta(1/l)$ and the field depth of a photographing lens.

In step S9, a lens extension amount in consideration of a moving object correction amount $\Delta b$ is calculated. Note that step S10 is executed when the moving object correction amount $\Delta b$ is not taken into consideration. In addition, $F_n(1/l_0)$ is a function of $1/l_0$.

No practical problem is posed when $\Delta b$ is set not to exceed 2Fd (F: an aperture value, d: the diameter of a maximum allowable circle of confusion). $\Delta b$ is preferably set to be equal to or smaller than Fd if a safety margin is considered. In this case, F may be open F, but may be a photometrically predicted F value. It is practical that d is variable depending on a photographing magnification. More specifically, when the photographing magnification is large, d may be large; otherwise, d must be small. Thus, an object, which is moving at high speed at a near distance, can be coped with.

In step S11, the photographing lens 6 is extended.

Figure 6A:
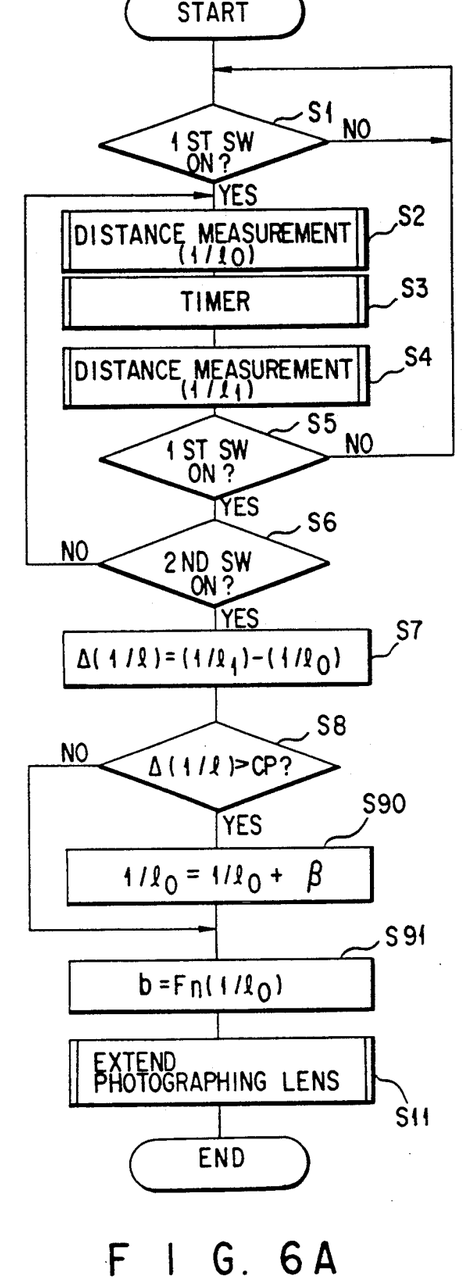
FIGS. 6A, 6B, and 6C are flow charts for explaining modifications of the first embodiment.
Figure 6B:
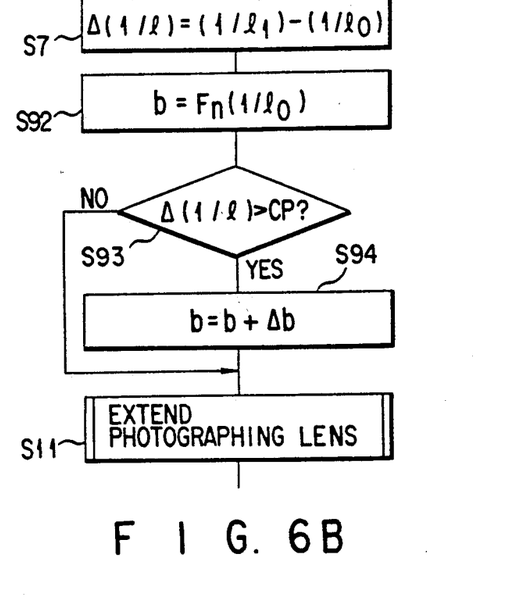
Figure 6C:
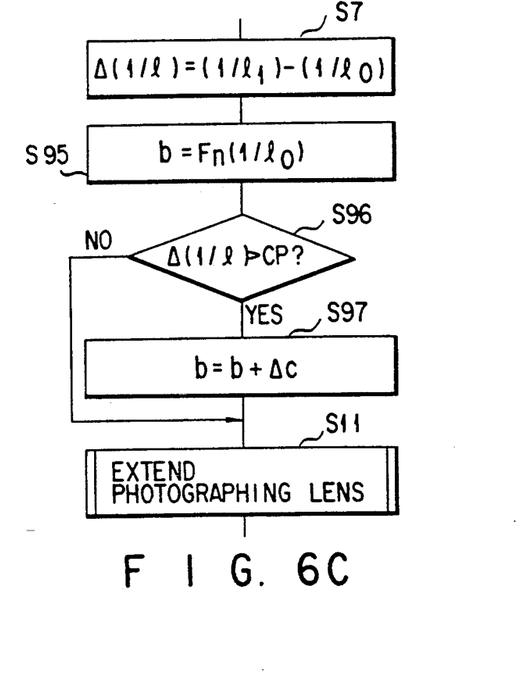

FIGS. 6A, 6B, and 6C show modifications of the first embodiment of the present invention. In FIGS. 6A, 6B, and 6C, steps S1 to S7, and step S11 are the same as those in the first embodiment.

In FIG. 6A, steps S9 and S10 in FIG. 3 are replaced with steps S90 and S91. More specifically, in the embodiment shown in FIG. 3, whether or not the correction driving amount $\Delta b$ is added to the lens driving amount b is determined according to whether or not $\Delta(1/l) > CP$, while in FIG. 6A, whether or not a correction amount $\beta$ is added to the first distance measurement value $1/l_0$ is determined according to whether or not $\Delta(1/l) > CP$. $\beta$ is given by:

$$\beta = \frac{\Delta b}{f^2}$$

(f = focal length)

In FIG. 6B, steps S8, S9, and S10 in FIG. 3 are replaced with steps S92, S93, and S94. More specifically, in the embodiment shown in FIG. 3, after it is discriminated whether or not $\Delta(1/l) > CP$, the driving amount b is obtained, while in FIG. 6B, after the driving amount b is obtained according to the first distance measurement value $1/l_0$, whether or not $\Delta(1/l) > CP$ is discriminated, and if YES is determined, the correction amount $\Delta b$ is added to the driving amount.

In FIG. 6C, steps S92, S93, and S94 in FIG. 6B are replaced with steps S95, S96, and S97. More specifically, in FIG. 6B, whether or not the correction amount $\Delta b$ is added to the driving amount b based on the first distance measurement value $(1/l_0)$ is determined, while in FIG. 6C, whether or not a correction amount $\Delta c$ is added to the second distance measurement value $(1/l_1)$ is determined according to whether or not $\Delta(1/l) > CP$.

The correction amount $\Delta c$ is given by:

$$\Delta c = \Delta b - \alpha$$

where α assumes a different value according to the distance measurement interval, the object speed, the object distance, or the like, and an optimal value is calculated by actual measurements.

Figure 7:
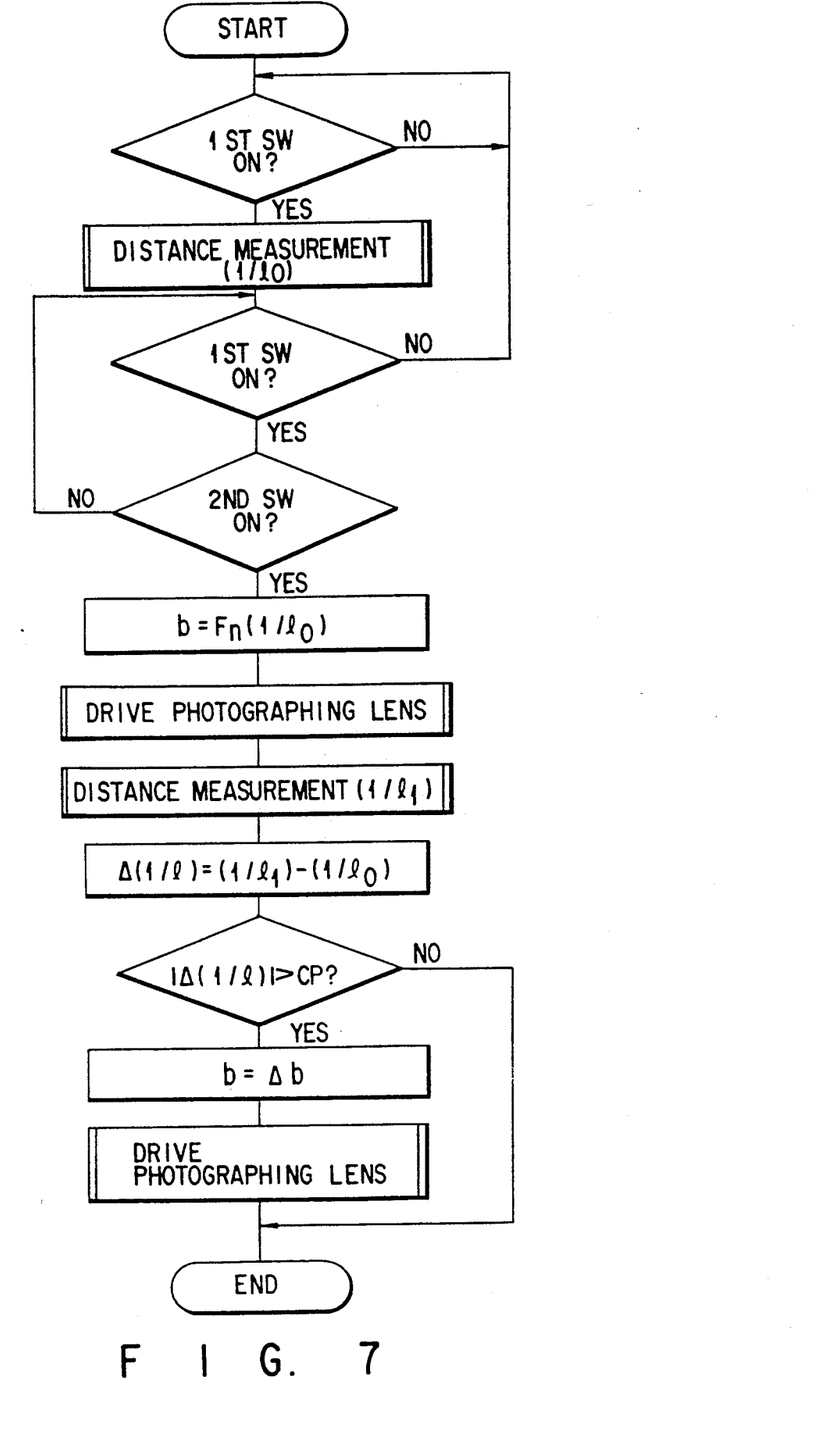
FIG. 7 is a flow chart for explaining the second embodiment of the present invention.

FIG. 7 shows the second embodiment of the present invention. In this embodiment, in order to improve precision of movement discrimination of an object, a time required for the discrimination is increased as much as possible.

This is equivalent to prolonging of a timer time in step S3 in FIG. 3. However, when the timer time is simply prolonged, a time lag is undesirably increased. This embodiment effectively utilizes a time required for driving a photographing lens in place of the timer. Thus, the precision of movement discrimination of an object can be improved without increasing a time lag.

This is apparent considering that comparison between $1/l_0$ and $(1/l_1)'$ can provide better precision than comparison between $1/l_0$ and $1/l_1$ in FIG. 10.

In this embodiment, in a photographing lens driving operation, under a condition that $|\Delta(1/l)| > CP$, if $\Delta(1/l)$ assumes a positive value, the lens is extended by $\Delta b$ to the closest distance side; if $\Delta(1/l)$ assumes a negative value, the lens is collapsed by $\Delta b$ to the far distance side. Thus, the lens driving operation can cope with a case wherein an object is approaching and is moving away from a camera.

Figure 11A:
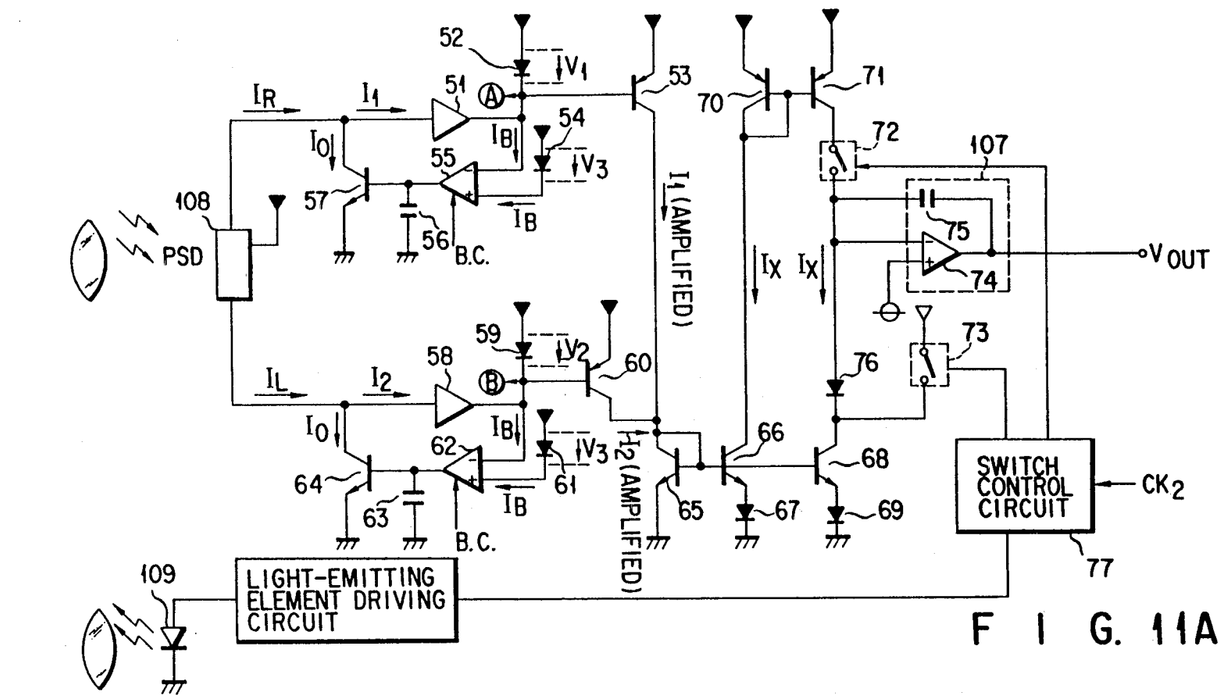
FIGS. 11A and 11B are diagrams showing the third embodiment of the present invention.

Fig. 11A shows the third embodiment of the present invention. As an object movement discrimination means 105, in place of utilizing a change in distance measurement value during a predetermined period of time, distance measurement light is projected toward an object a plurality of number of times at predetermined timings, an integration means positively or negatively integrates currents according to the amounts of light received by a light-receiving means in accordance with the light projection timings, and movement of the object is discriminated on the basis of the output from the integration means. As shown in FIGS. 12A to 12D, this moving object detection apparatus repeats a positive or negative integration of light reflected by a object in each light projection operation. When the object is moving toward the near distance side, $V_{OUT}$ has a given magnitude; when it is not moving, $V_{OUT}=0$. The moving object detection apparatus is assembled in the distance measurement circuit 4 shown in FIG. 2, and the output $V_{OUT}$ is connected to an A/D conversion input port (not shown) of the CPU 1.

In Fig. 11A, when an infrared light-emitting diode 109 does not emit light, an output current $I_R$ from a semiconductor position detection element (PSD) 108 consists of only current components caused by light such as sun light, illumination light, and the like (to be referred to as steady light hereinafter) other than infrared light from the infrared light-emitting diode 109. The output current $I_R$ from the PSD 108 is amplified by a pre-amplifier 51, and the amplified current is input to the (−) input terminal of an operational amplifier 55. The input current at this time is represented by $I_B$. On the other hand, the (+) input terminal of the operational amplifier 55 receives a constant current $I_C$. Therefore, the output from the operational amplifier 55 is proportional to the difference between $I_C$ and $I_B$. Since the output from the operational amplifier 55 is input to the base of a hold transistor 57, a base current proportional to the difference between $I_C$ and $I_B$ flows through the hold transistor 57, and the hold transistor 57 is enabled. For this reason, some components of the output current $I_R$ from the PSD 108 are flowed out to a ground terminal, and the input current $I_B$ to the operational amplifier 55 is decreased. In this manner, when the infrared light-emitting diode 109 does not emit light, it is controlled so that amplification by the pre-amplifier 51 is apparently not performed. At this time, a potential different $V_1$ between the anode and cathode of a compression diode 52 becomes equal to a potential different $V_3$ between the anode and cathode of a monitor diode 54. In this case, even when the output current $I_R$ from the PSD 108 is increased or decreased, the base current of the hold transistor 57 changes upon a change in $I_B$ due to the increase or decrease in $I_R$, and the current value flowed out from the PSD 108 to the ground terminal through the hold transistor 57 increases or decreases. For this reason, $V_1$ and $V_2$ remain to coincide with each other. Note that the output voltage from the operational amplifier 55 is stored in a capacitor 56.

Then, the infrared light-emitting diode 109 is caused to emit light. At the same time, the operational amplifier 55 is disabled in response to a bias cut signal B,C. When infrared light from the infrared light-emitting diode 109 is reflected by an object, and is focused on the light-receiving surface of the PSD 108, the output current $I_R$ from the PSD 108 is increased by a predetermined amount (this increment corresponds to a signal current $I_1$). Since the capacitor 56 holds the output voltage immediately before the operational amplifier 55 is disabled, the base current of the hold transistor 57 does not change for a predetermined period of time. Therefore, the current value flowed out from the PSD 108 to the ground terminal through the hold transistor 57 does not change. For this reason, the input to the pre-amplifier 51 is increased by the signal current $I_1$. Furthermore, since the operational amplifier 55 is OFF, even when the output from the pre-amplifier 51 is increased by the signal current $I_1$, the current value flowed out from the PSD 108 to the ground terminal through the hold transistor 57 does not change. In this manner, the pre-amplifier 51 can amplify only the signal current $I_1$.

Similarly, a pre-amplifier 58 amplifies a signal current $I_2$.

The signal current $I_1$ amplified by the pre-amplifier 51 and the signal current $I_2$ amplified by the pre-amplifier 58 are respectively folded by a current mirror circuit consisting of the diode 52 and a transistor 53 and a current mirror circuit consisting of a diode 59 and a transistor 60, and are then added to each other. The sum current is flowed into the collector and base of a transistor 65. The transistor 65 has a base common to those of transistors 66 and 68, and the emitters of the transistors 66 and 68 are respectively connected to diodes 67 and 69. The transistors 66 and 68 constitute a current mirror circuit, and the current values of their collector currents coincide with each other. This current value is represented by $I_X$.

A base potential $V_B$ of the transistors 66 and 68 is given by:

$$V_B = V_T \ln(I_1 + I_2)/I_S \qquad (1)$$

where $V_T$ is the thermal voltage, and IS is the reverse saturation current.

The corrector current $I_X$ of the transistors 66 and 68 is given by:

$$I_X = I_S \exp(V_B/2 \times 1/V_T) = I_S \{(I_1 + I_2)/I_S\}^{\frac{1}{2}} \qquad (2)$$

Therefore, equation (2) is substituted in equation (1), and we have:

$$I_X = \{(I_1 + I_2)/I_S\} \quad (3)$$

On the other hand, $I_1 + I_2$ is proportional to the square of an object distance l. Therefore, $I_X$ is inversely proportional to the object distance l, and can be expressed as:

$$I_X = k \cdot (1/l^2) \quad (k \text{ is a constant}) \quad (4)$$

$I_X$ is integrated by a circuit consisting of an integration capacitor 75 and an operational amplifier 74. When both switches 72 and 73 are OFF, $I_X$ is flowed out through a diode 76, and a value obtained by positively integrating a voltage proportional to $I_X$ is output from $V_{OUT}$. When the switch 73 is turned on while the switch 72 is kept OFF, no integration is performed. Furthermore, when both the switches 72 and 73 are turned on, $I_X$ is flowed in by a current mirror circuit constituted by transistors 70 and 71, and a negative integration is performed. The ON/OFF control of the switches 72 and 73 is performed by a switch control circuit 77 on the basis of an input clock CK2 from a timing control circuit.

The output value $V_{OUT}$ of an integration circuit 107 obtained in this manner is input to a CPU. The CPU discriminates based on the value $V_{OUT}$ whether or not an object is a moving object.

Figure 12A:
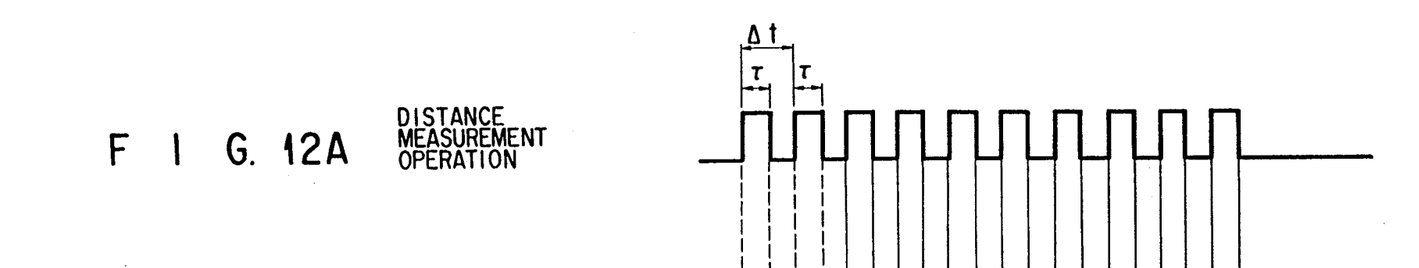
FIGS. 12A to 12D are timing charts for explaining a change in $V_{OUT}$ caused by movement of an object.
Figure 12B:
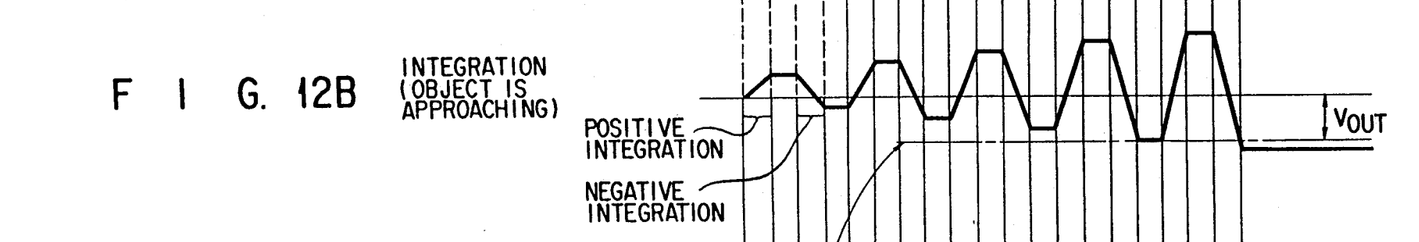
Figure 12C:
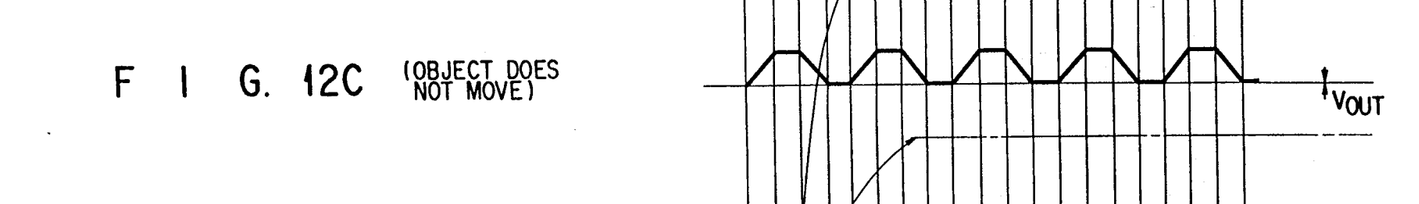
Figure 12D:
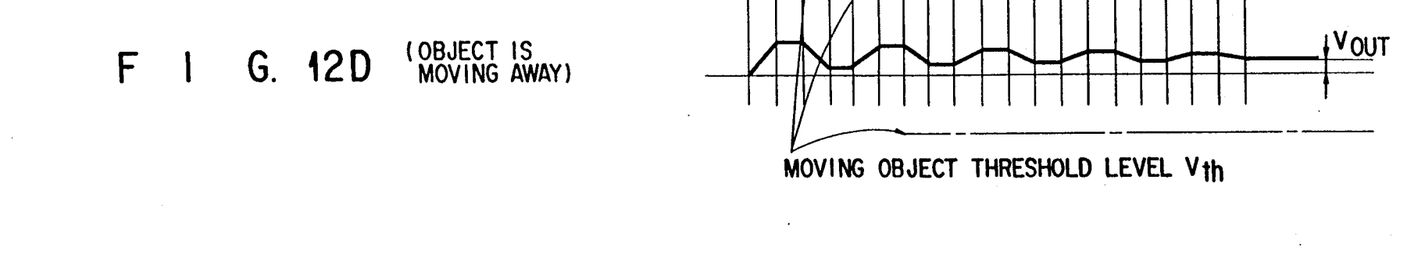

More specifically, when an object is approaching, as shown in FIG. 12B, $V_{OUT}$ after an elapse of a predetermined period of time exceeds a moving object threshold level $V_{th}$; when the object does not move (FIG. 12C) or is moving away from a camera (FIG. 12D), $V_{OUT}$ does not exceed the moving object threshold level. The moving object threshold level need only be set at a level, which can prevent that a non-moving object is erroneously determined to be a moving object due to noise of the moving object detection apparatus.

Figure 11B:
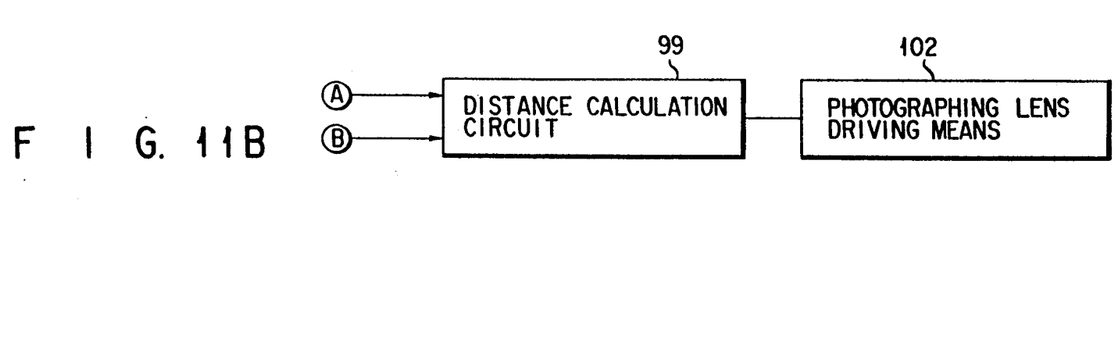

Note that the object distance is obtained by calculating $I_1(I_1 + I_2)$ by a distance calculation circuit 99 (FIG. 11B) on the basis of the output currents $I_1$ and $I_2$ from the PSD 108 in Fig. 11A. A photographing lens driving means 102 drives a photographing lens according to the calculated value.

In this manner, a first distance measurement value $1/l_0$ and a moving object discrimination output $V_0$ are obtained.

Figure 8:
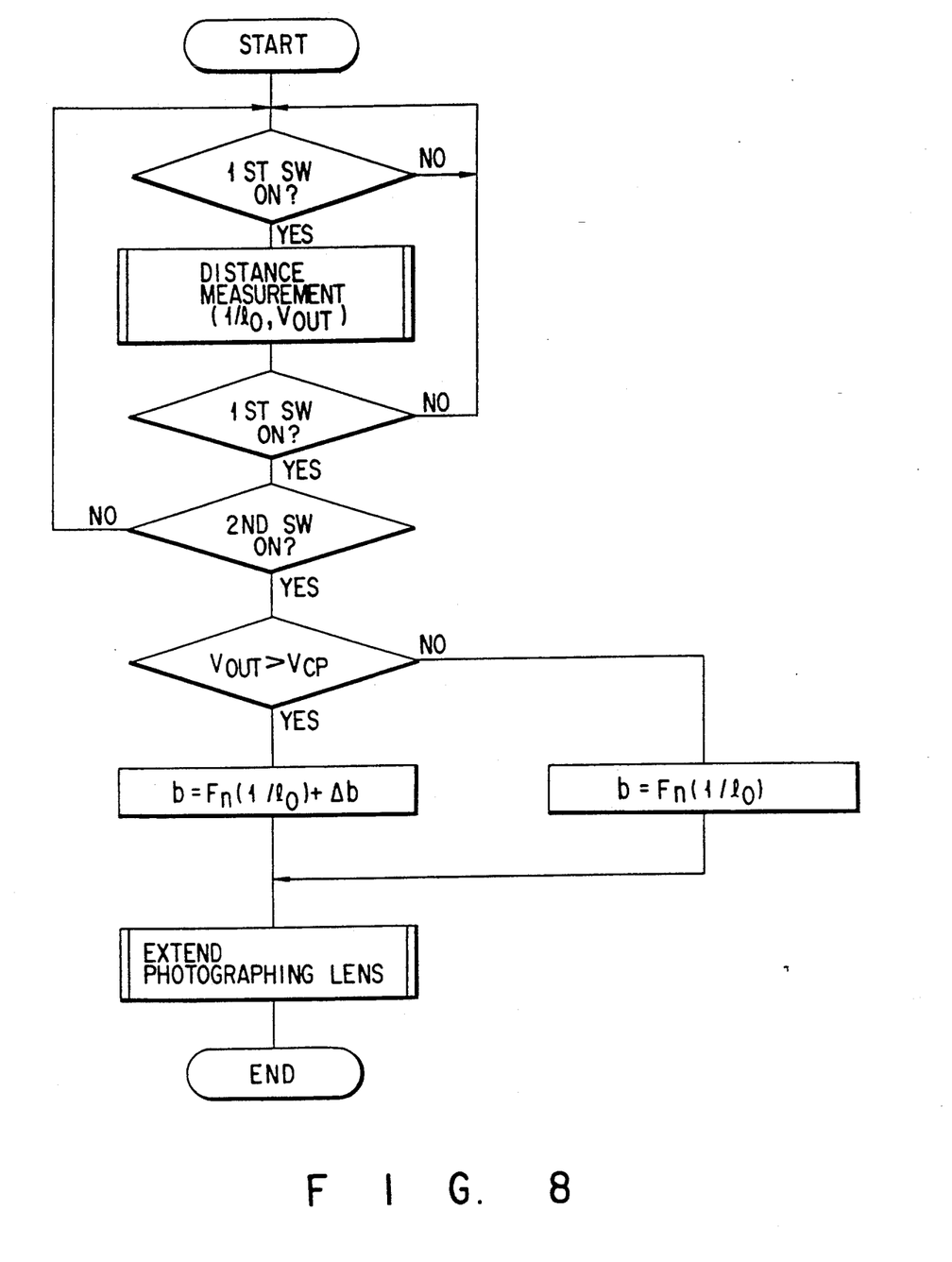
FIG. 8 is a flow chart for explaining the third embodiment of the present invention.

FIG. 8 shows the operation of the embodiment using the above-mentioned moving object detection apparatus. The flow is substantially the same as that in FIG. 3 except that steps S3, S4, and S7 are omitted, and a detailed description thereof will be omitted.

The operation after it is discriminates whether or not the object is a moving object is the same as that described above. When the above-mentioned object movement discrimination means detects that the object is a moving object, the photographing lens is extended by an amount obtained by adding an extension amount corresponding to the first distance measurement value $1/l_0$ and a predetermined amount $\Delta b$; when it detects, that the object is a non-moving object, the lens is extended based on the first distance measurement value. $\Delta b$ can be set to be, e.g., Fd.

According to this embodiment, since no complicated correction value calculations are necessary, and calculations are performed using fixed values, moving object correction can be executed by a very simple flow or arrangement without increasing a time lag.

As described above, the present invention can provide a very simple distance measurement apparatus for a camera, which can prevent erroneous correction due to low movement detection precision of an object, and can reduce a time lag caused by moving object correction.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An auto-focus apparatus for a camera, comprising:
   distance measurement means for projecting infrared light toward an object, receiving the infrared light reflected by the object, and outputting a signal according to an object distance;
   control means for operating said distance measurement means twice at a predetermined time interval;
   discrimination means for discriminating on the basis of two output signals output from said distance measurement means operated by said control means whether or not the object is moving to a near distance side by an amount not less than a predetermined amount;
   arithmetic means for converting the output signals from said distance measurement means into an extension amount of a photographing lens, said arithmetic means including means for, when said discrimination means discriminates that the object is moving to the near distance side, adding a predetermined value to the extension amount; and
   driving means for driving said photographing lens from an initial position to a position based on a conversion output from said arithmetic means.

2. An apparatus according to claim 1, wherein the initial position includes an infinity position.

3. An apparatus according to claim 1, wherein said arithmetic means includes means for determining the predetermined value to be added to the extension amount on the basis of an exposure aperture value and a diameter of a maximum allowable circle of confusion.

4. A distance measurement apparatus for a camera, comprising:
   distance measurement means for time-serially performing a plurality of number of times of distance measurement operations;
   discrimination means for discriminating on the basis of time-serial outputs from said distance measurement means whether or not a moving amount of an object in a photographing optical axis direction is not less than a predetermined amount; and
   correction means for, when said discrimination means discriminates that the moving amount of the object is not less than the predetermined amount, adding a predetermined correction amount to the outputs from said distance measurement means.

5. An apparatus according to claim 4, wherein said correction means includes means for obtaining the predetermined amount on the basis of the following equation:

$$CP = (1/a2 - 1/a1) \times \Delta t1/\Delta t2$$

where

CP: a discrimination value indicating whether or not the moving amount is not less than the predetermined amount a1: an object distance based on a first distance measurement operation a2: an object distance obtained by adding an in-focus allowable distance to a1 in consideration of a depth of field Δt1: a time interval between first and second distance measurement operations Δt2: a time interval from the first distance measurement operation to the beginning of an opening operation of a shutter.

6. An apparatus according to claim 4, wherein said correction means includes means for obtaining the predetermined amount on the basis of the following equation:

$$\Delta b = 2 \times F \times d$$

where

Δb: a correction amount

F: an aperture value d: a diameter of a maximum allowable circle of confusion.

7. An apparatus according to claim 6, wherein said aperture value is a maximum open value.

8. An apparatus according to claim 6, wherein said correction means includes means for setting the aperture value according to an object brightness.

9. A lens driving amount determination method for an auto-focus camera, comprising the steps of:

performing a first distance measurement operation;

waiting for a predetermined period of time;

performing a second distance measurement operation;

determining a driving amount of a photographing lens using at least one of two distance measurement signals obtained by the first and second distance measurement operations; and correcting the driving amount when a difference between the two distance measurement signals is not less than a predetermined value.

10. An auto-focus method for a camera, comprising the steps of:

performing a first distance measurement operation according to a half-stroke operation of a shutter release button;

driving a photographing lens on the basis of a first distance measurement result;

performing a second distance measurement operation after said photographing lens is driven;

discriminating on the basis of the first and second distance measurement results whether or not a moving amount of an object in a photographing optical axis direction is not less than a predetermined amount; and additionally driving said photographing lens when the discrimination results indicates that the moving amount is not less than the predetermined amount.

11. An auto-focus apparatus for a camera, comprising:

light projection means for time-serially performing a plurality of number of times of light projection operations to an object;

distance measurement means for time-serially receiving the light projected from said light projection means and reflected by the object to detect an amount of received light so as to measure a distance to the object, and integrating the amount of received light to discriminate a moving amount of the object;

photographing lens driving means for driving a photographing lens on the basis of an output from said distance measurement means; and driving amount correction means for, when said distance measurement means discriminates that the object is moved by an amount not less than a predetermined amount, adding a predetermined correction amount to a driving amount of said photographing lens based on the output from said distance measurement means.

12. An auto-focus method for a camera which comprises distance measurement means for projecting infrared light toward an object, receiving the infrared light reflected by the object, and outputting a signal according to an object distance, comprising the steps of:

outputting a first distance measurement signal;

extending a photographing lens from an initial position on the basis of the first distance measurement signal;

outputting a second distance measurement signal;

obtaining a moving amount and a moving direction of the object on the basis of the first and second distance measurement signals; and extending or collapsing said photographing lens by a predetermined amount according to the moving direction only when the moving amount is not less than a predetermined value.

13. An auto-focus apparatus for a camera, comprising:

distance measurement means for outputting a signal according to an object distance;

movement detection means for outputting a signal according to object movement;

arithmetic means for converting the output signal from said distance measurement means into an extension amount of a photographing lens, said arithmetic means including means for, when said movement detection means detects object movement of not less than a predetermined amount, adding a predetermined correction amount to the extension amount; and driving means for driving said photographing lens from an initial position on the basis of an output from said arithmetic means.

14. A distance measurement apparatus for a camera in which an optical axis of a photographing lens is separated from an optical axis of distance measurement means, comprising:

object moving amount discrimination means for discriminating on the basis of an output from said distance measurement means whether or not a moving amount of an object in a photographing optical axis direction is not less than a predetermined amount;

photographing lens driving means for driving said photographing lens on the basis of the output from said distance measurement means; and driving amount correction means for, when said object moving amount discrimination means discriminates movement of an object of not less than the predetermined amount, adding a predetermined correction amount to a driving amount of said photographing lens on the basis of the output from said distance measurement means.

15. An auto-focus apparatus for a camera in which an optical axis of a photographing lens is separated from an optical axis of distance measurement means, comprising:

discrimination means for discriminating on the basis of an output from said distance measurement means whether or not a moving amount of an object in a photographing optical axis direction is not less than a predetermined amount;

correction means for, when said discrimination means discriminates movement of the object of not less than the predetermined amount, adding a predetermined correction amount to the output from said distance measurement means; and driving means for driving said photographing lens on the basis of the output from said distance measurement means or an output added with the correction amount.

16. A lens driving amount determination apparatus for an auto-focus camera, comprising:

distance measurement means for outputting a signal according to an object distance;

detection means for detecting whether or not an object is moving; and arithmetic means for converting the output signal from said distance measurement means into a lens driving amount, said arithmetic means including means for, when said detection means detects movement of the object, adding a predetermined correction value to the lens driving amount.

17. An apparatus according to claim 16, wherein said detection means includes means for calculating a difference between a plurality of distance measurement signals output from said distance measurement means, and for, when the difference is not less than the predetermined amount, determining that the object is moving.

18. An auto-focus apparatus for measuring an object distance, and adjusting a focal point position of a photographing lens according to the object distance value, comprising:

distance measurement means for performing a plurality of number of times of distance measurement operations at different timings;

discrimination means for discriminating on the basis of a plurality of distance measurement signals obtained by the plurality of number of times of distance measurement operations whether or not an object is moving; and correction means for, when said discrimination means discriminates movement of the object, correcting the adjusted focal point position of said photographing lens by a predetermined amount.

19. An apparatus according to claim 18, wherein said discrimination means includes means for, when a difference between two distance measurement signals is not less than a predetermined value, discriminating that the object is moving.

* * * * *